US007205981B2

(12) United States Patent
Cunningham

(10) Patent No.: US 7,205,981 B2
(45) Date of Patent: Apr. 17, 2007

(54) METHOD AND APPARATUS FOR PROVIDING RESISTIVE HAPTIC FEEDBACK USING A VACUUM SOURCE

(75) Inventor: Richard L. Cunningham, Washington, DC (US)

(73) Assignee: Immersion Corporation, San Jose, CA (US)

( * ) Notice: Subject to any disclaimer, the term of this patent is extended or adjusted under 35 U.S.C. 154(b) by 204 days.

(21) Appl. No.: 10/803,097

(22) Filed: Mar. 18, 2004

(65) Prior Publication Data

US 2005/0209741 A1    Sep. 22, 2005

(51) Int. Cl.
    *G09G 5/08*    (2006.01)
(52) U.S. Cl. .................. 345/163; 345/167; 715/701
(58) Field of Classification Search ............ 340/407.1, 340/407.2, 686.1, 686.3, 626; 715/701; 345/156, 163, 167; 434/262
    See application file for complete search history.

(56) References Cited

U.S. PATENT DOCUMENTS

| 2,972,140 | A |   | 2/1961  | Hirsch         |
|-----------|---|---|---------|----------------|
| 3,157,853 | A |   | 11/1964 | Hirsch         |
| 3,220,121 | A |   | 11/1965 | Cutler         |
| 3,497,668 | A |   | 2/1970  | Hirsch         |
| 3,517,446 | A |   | 6/1970  | Corlyon et al. |
| 3,612,377 | A | * | 10/1971 | Pembroke ........... 226/195 |
| 3,623,064 | A |   | 11/1971 | Kagan          |
| 3,872,952 | A | * | 3/1975  | Poggie ............. 188/181 T |
| 3,902,687 | A |   | 9/1975  | Hightower      |
| 3,903,614 | A |   | 9/1975  | Diamond et al. |
| 3,911,416 | A |   | 10/1975 | Feder          |
| 4,127,752 | A |   | 11/1978 | Lowthorp       |
| 4,160,508 | A |   | 7/1979  | Salsbury, Jr.  |
| 4,236,325 | A |   | 12/1980 | Hall et al.    |
| 4,262,549 | A |   | 4/1981  | Schwellenbach  |
| 4,333,070 | A |   | 6/1982  | Barnes         |
| 4,464,117 | A |   | 8/1984  | Foerst         |
| 4,484,191 | A |   | 11/1984 | Vavra          |
| 4,513,235 | A |   | 4/1985  | Acklam et al.  |

(Continued)

FOREIGN PATENT DOCUMENTS

EP            0349086           1/1990

(Continued)

OTHER PUBLICATIONS

Baigrie, "Electric Control Loading—A Low Cost, High Performance Alternative," *Proceedings of Interservice/Industry Training Systems Conference*, pp. 247-254, Nov. 6-8, 1990.

(Continued)

*Primary Examiner*—Thomas Mullen
(74) *Attorney, Agent, or Firm*—Thelen Reid Brown Raysman & Steiner LLP; Daivd B. Ritchie

(57) ABSTRACT

A method and apparatus is described for applying haptic feedback using a vacuum source. A housing includes a cavity. The cavity can be positioned near a moveable member such that the cavity of the housing and the moveable member define a volume. The volume has an associated internal pressure. The internal pressure within the volume can be modified based on a received signal such that a resistive force is applied to the moveable member as the pressure is modified.

25 Claims, 13 Drawing Sheets

U.S. PATENT DOCUMENTS

| | | | |
|---|---|---|---|
| 4,581,491 A | 4/1986 | Boothroyd | |
| 4,599,070 A | 7/1986 | Hladky et al. | |
| 4,708,656 A | 11/1987 | De Vries et al. | |
| 4,713,007 A | 12/1987 | Alban | |
| 4,794,392 A | 12/1988 | Selinko | |
| 4,885,565 A | 12/1989 | Embach | |
| 4,891,764 A | 1/1990 | McIntosh | |
| 4,930,770 A | 6/1990 | Baker | |
| 4,934,694 A | 6/1990 | McIntosh | |
| 5,019,761 A | 5/1991 | Kraft | |
| 5,022,384 A | 6/1991 | Freels | |
| 5,022,407 A | 6/1991 | Horch et al. | |
| 5,035,242 A | 7/1991 | Franklin | |
| 5,038,089 A | 8/1991 | Szakaly | |
| 5,078,152 A | 1/1992 | Bond | |
| 5,165,897 A | 11/1992 | Johnson | |
| 5,175,459 A | 12/1992 | Danial et al. | |
| 5,186,695 A | 2/1993 | Mangseth et al. | |
| 5,212,473 A | 5/1993 | Louis | |
| 5,240,417 A | 8/1993 | Smithson et al. | |
| 5,271,290 A | 12/1993 | Fischer | |
| 5,275,174 A | 1/1994 | Cook | |
| 5,283,970 A | 2/1994 | Aigner | |
| 5,299,810 A | 4/1994 | Pierce | |
| 5,309,140 A | 5/1994 | Everett | |
| 5,334,027 A | 8/1994 | Wherlock | |
| 5,436,622 A | 7/1995 | Gutman et al. | |
| 5,437,607 A | 8/1995 | Taylor | |
| 5,466,213 A | 11/1995 | Hogan | |
| 5,547,382 A | 8/1996 | Yamasaki | |
| 5,575,761 A | 11/1996 | Hajianpour | |
| 5,690,582 A | 11/1997 | Ulrich et al. | |
| 5,766,016 A | 6/1998 | Sinclair | |
| 5,785,630 A | 7/1998 | Bobick et al. | |
| 6,111,577 A | 8/2000 | Zilles et al. | |
| 6,129,507 A * | 10/2000 | Ganelin | 415/1 |
| 6,160,489 A | 12/2000 | Perry et al. | |
| 6,422,941 B1 | 7/2002 | Thorner et al. | |
| 2002/0054060 A1* | 5/2002 | Schena | 345/701 |

FOREIGN PATENT DOCUMENTS

| | | |
|---|---|---|
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

Iwata, "Pen-based Haptic Virtual Environment," 0-7803-1363-1/93 IEEE, pp. 287-292, 1993.

Russo, "The Design and Implementation of a Three Degree of Freedom Force Output Joystick," MIT Libraries Archives, pp. 1-131, May 1990, archived Aug. 14, 1990.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Jones et al., "A perceptual analysis of stiffness," ISSN 0014-4819 Springer International (Springer-Verlag); *Experimental Brain Research*, vol. 79, No. 1, pp. 150-156, 1990.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25-44, May 2, 1993.

Snow et al., "Model-X Force-Reflecting-Hand-Controller," NT Control No. NPO-17851; JPL Case No. 7348, pp. 1-4, with 45 pages of attachments, Jun. 15, 1989.

Ouh-Young, "Force Display in Molecular Docking," Doctoral Dissertation, University of North Carolina at Chapel Hill, UMI Order No. 9034744, pp. 1-369, 1990.

Tadros, Control System Design for a Three Degree of Freedom Virtual Environment Simulator Using Motor/Brake Pair Actuators, *MIT Archive*, pp. 1-88, Feb. 1990, archived Aug. 13, 1990.

Caldwell et al., "Enhanced Tactile Feedback (Tele-Taction) Using a Multi-Functional Sensory System," 1050-4729/93, pp. 955-960, 1993.

Adelstein, "Design and Implementation of a Force Reflecting Manipulandum for Manual Control research," DSC-vol. 42, *Advances in Robotics*, pp. 1-12, 1992.

Gotow et al., "Controlled Impedance Test Apparatus for Studying Human Interpretation of Kinesthetic Feedback," WA11-11:00, pp. 332-337.

Stanley et al., "Computer Simulation of Interacting Dynamic Mechanical Systems Using Distributed Memory Parallel Processors," DSC-vol. 42, *Advances in Robotics*, pp. 55-61, ASME 1992.

Russo, "Controlling Dissipative Magnetic Particle Brakes in Force Reflective Devices," DSC-vol. 42, *Advances in Robotics*, pp. 63-70, ASME 1992.

Kontarinis et al., "Display of High-Frequency Tactile Information to Teleoperators," *Telemanipulator Technology and Space Telerobotics*, Won S. Kim, Editor, Proc. SPIE vol. 2057, pp. 40-50, Sep. 7-9, 1993.

Patrick et al., "Design and Testing of A Non-reactive, Fingertip, Tactile Display for Interaction with Remote Environments," *Cooperative Intelligent Robotics in Space*, Rui J. deFigueiredo et al., Editor, Proc. SPIE vol. 1387, pp. 215-222, 1990.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man-Machine Interface for Advanced Teleoperation," Science, vol. 208, No. 4450, pp. 1327-1335, 1980.

Bejczy et al., "Generalization of Bilateral Force-Reflecting Control of Manipulators," *Proceedings Of Fourth CISM-IFToMM*, Sep. 8-12, 1981.

McAffee, "Teleoperator Subsystem/Telerobot Demonsdtrator: Force Reflecting Hand Controller Equipment Manual," *JPL* D-5172, Jan. 1988.

Minsky, "Computational Haptics: The Sandpaper System for Synthesizing Texture for a Force-Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV'91 Conference & Exposition*, Hollywood, Florida, May 21-23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30-Oct. 1, 1992.

IBM Technical Disclosure Bulletin, "Mouse Ball-Actuating Device With Force and Tactile Feedback," vol. 32, No. 9B, Feb. 1990.

Terry et al., "Tactile Feedback In A Computer Mouse," *Proceedings of Fouteenth Annual Northeast Bioengineering Conference*, University of New Hampshire, Mar. 10-11, 1988.

Howe, "A Force-Reflecting Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf-blind individuals," *IEEE Virtual Reality Annual International Symposium*, Seattle, WA, Sep. 18-22, 1993.

Rabinowitz et al., "Multidimensional tactile displays: Identification of vibratory intensity, frequency, and contactor area," *Journal of The Acoustical Society of America*, vol. 82, No. 4, Oct. 1987.

Bejczy et al., "Kinesthetic Coupling Between Operator and Remote Manipulator," *International Computer Technology Conference, The American Society of Mechanical Engineers*, San Francisco, CA, Aug. 12-15, 1980.

Bejczy et al., "A Laboratory Breadboard System For Dual-Arm Teleoperation," *SOAR '89 Workshop*, JSC, Houston, TX, Jul. 25-27, 1989.

Ouh-Young, "A Low-Cost Force Feedback Joystick and Its Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8-11, 1994.

Bejczy, et al., "Universal Computer Control System (UCCS) For Space Telerobots," CH2413- 3/87/0000/0318501.00 1987 IEEE, 1987.

Patrick, "Design, Construction, and Testing of a Fingertip Tactile Display for Interaction with Virtual and Remote Environments," *Master of Science Thesis*, MIT, Aug. 1990, archived Nov. 8, 1990.

Calder, "Design of A Force-Feedback Touch-Introducing Actuator For Teleoperator Robot Control," *Bachelor of Science Thesis*, MIT, May 1983, archived Jun. 23, 1983.

Wiker, "Teletouch Display Development: Phase 1 Report," *Technical Report 1230*, Naval Ocean Systems Center, San Diego, Jul. 1988.

Bliss, "Optical-to-Tactile Image Conversion for the Blind," *IEEE Transactions on Man-Machine Systems*, vol. MMS-11, No. 1, Mar. 1970.

Johnson, "Shape-Memory Alloy Tactile Feedback Actuator," *Armstrong Aerospace Medical Research Laboratory*, AAMRL-TR-90-039, Aug. 1990.

Kontarinis et al., "Tactile Display of Vibratory Information in Teleoperation and Virtual Environments," PRESENCE, 4(4):387-402, Harvard Univ., 1995.

Aukstakalnis et al., "Silicon Mirage: The Art and Science of Virtual Reality," ISBN 0-938151-82-7, pp. 129-180, 1992.

Eberhardt et al., "Inducing Dynamic Haptic Perception by The Hand: System Description and Some Results," DSC-vol. 55-1, *Dynamic Systems and Control*: vol. 1, ASME 1994.

Gobel et al., "Tactile Feedback Applied to Computer Mice," *International Journal of Human-Computer Interaction*, vol. 7, No. 1, pp. 1-24, 1995.

Pimentel et al., "Virtual Reality: through the new looking glass," 2$^{nd}$ Edition; McGraw-Hill, ISBN 0-07-050167-X, pp. 41-202, 1994.

"Cyberman Technical Specification," *Logitech Cyberman SWIFT Supplement to Logitech Mouse Technical Reference and Programming Guide*, Apr. 5, 1994.

Ouhyoung et al., "The Development of A Low-Cost Force Feedback Joystick and Its Use in the Virtual Reality Environment," *Proceedings of the Third Pacific Conference on Computer Graphics and Applications, Pacific Graphics '95*, Seoul, Korea, Aug. 21-24, 1995.

Kaczmarek et al., "Tactile Displays," *Virtual Environment Technologies*, Chap. 9, pp. 349-414.

Lake, "Cyberman from Logitech," at http://www.ibiblio.org/GameBytes/issue21/greviews/cyberman.html, 1994.

"Component Maintenance Manual With Illustrated Parts List, Coaxial Control Shaker Part No. C-25502," Safe Flight Instrument Corporation, Revised Jan. 28, 2002 (3 pages).

"Technical Manual Overhaul Instructions With Parts Breakdown, Coaxial Control Shaker Part No. C-25502," Safe Flight Instrument Corporation, Revised Jul. 15, 1980 (23 pages).

Scannell, "Taking a Joystick Ride," *Computer Currents*, Boston Edition, vol. 9, No. 11, Nov. 1994.

Yamakita et al., "Tele-Virtual Reality of Dynamic Mechanical Model," *Proceedings of the 1992 IEEE/RSJ International Conference on Intelligent Robots and Systems*, Raleigh, NC, Jul. 7-10, 1992.

Noll, "Man-Machine Tactile," *SID Journal*, Jul./Aug. 1972 Issue.

Rosenberg, "Virtual Fixtures: Perceptual Overlays Enhance Operator Performance In Telepresence Tasks," *Ph.D. Dissertation*, Stanford University, Jun. 1994.

\* cited by examiner

METHOD AND APPARATUS FOR PROVIDING RESISTIVE HAPTIC FEEDBACK USING A VACUUM SOURCE

FIELD OF THE INVENTION

The invention relates generally to a method and apparatus for producing haptic feedback. More particularly, the invention relates to a method and apparatus for producing resistive haptic feedback by changing the pressure within a housing.

BACKGROUND OF THE INVENTION

In general, haptic feedback can be applied using any number of different actuators. For example, haptic feedback can be applied using a direct current (DC) motor, a hydraulic actuator, a magnetic brake, or an electromagnetic brake.

In a haptic feedback system, for example, a processor can output a haptic feedback signal to an actuator. The actuator can output haptic feedback based on the haptic feedback signal received from the processor. In some systems, for example, the processor can receive signals from a sensor. The processor can generate the haptic feedback signal based on the received signal from the sensor.

Although many different types of actuators for haptic devices exist, a need exists for another type of actuator for haptic devices. Such an additional type of actuator can have performance characteristics different from that of known actuators, and these different performance characteristics can be desirable in certain applications.

SUMMARY OF THE INVENTION

A housing defines a cavity. The cavity is positioned near a moveable member such that the cavity of the housing and the moveable member define a volume. The volume has an associated internal pressure. The internal pressure within the volume can be modified based on a received signal such that a resistive force is applied to the moveable member as the pressure is modified.

DETAILED DESCRIPTION

A method and apparatus is described for applying haptic feedback using a vacuum source. A housing includes a cavity. The cavity is positioned near a moveable member such that the cavity of the housing and the moveable member define a volume. The volume has an associated internal pressure. The internal pressure within the volume can be modified based on a received signal such that a resistive force is applied to the moveable member as the pressure is modified.

Figure 1:
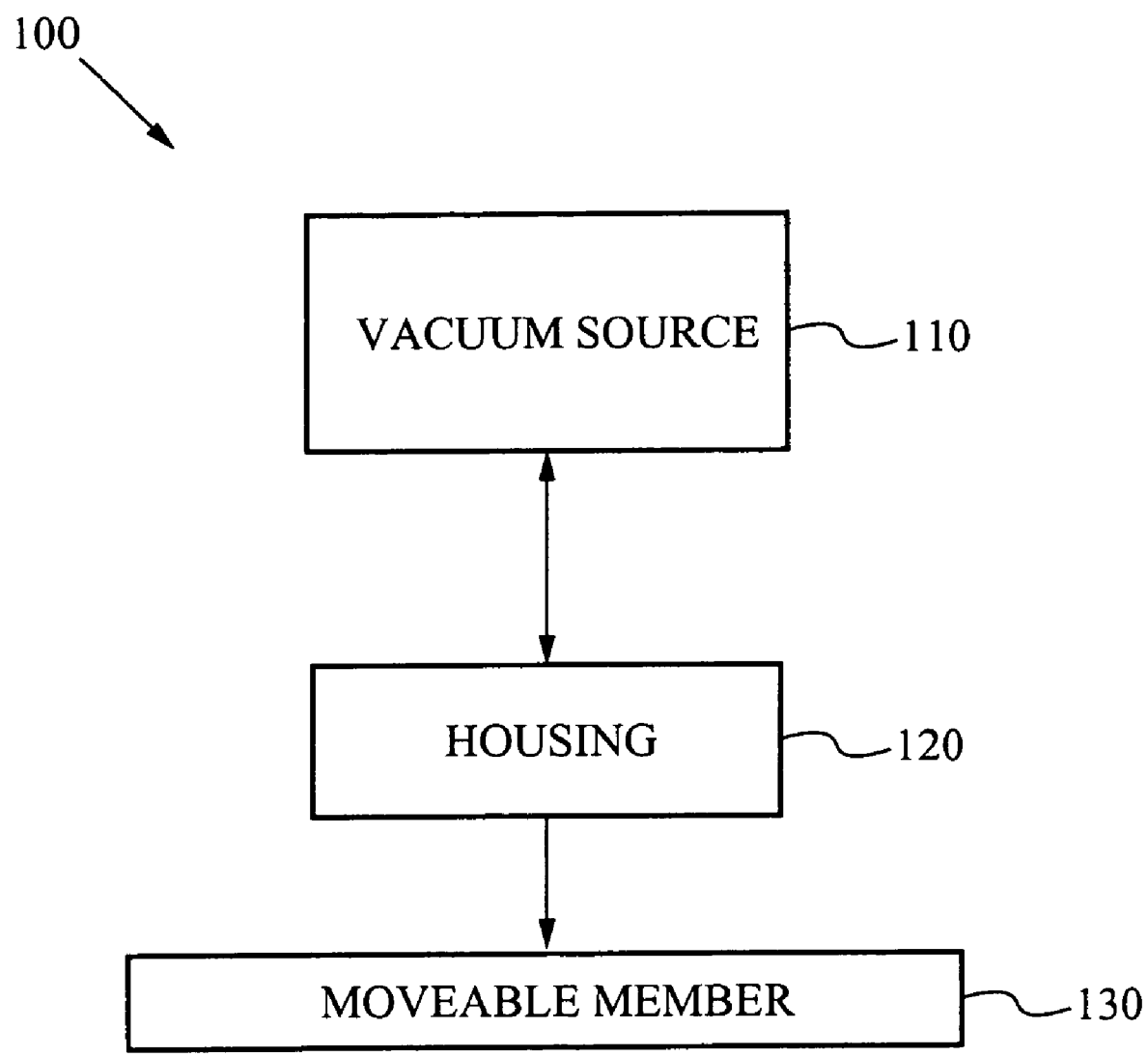
FIG. 1 is a functional block diagram illustrating a haptic feedback system, according to an embodiment of the invention.

FIG. 1 is a functional block diagram illustrating a haptic feedback system. The haptic feedback system 100 can include a vacuum source 110. The vacuum source 110 can be coupled to a housing 120. The housing 120 can be located adjacent to moveable member 130, such that the housing can be, for example, in contact with the moveable member 130 and have a variable frictional engagement.

Housing 120 can be hollow, thereby defining a cavity. The cavity can be located adjacent to moveable member 130. When housing 120 is located adjacent to moveable member 130, the cavity defined by housing 120 forms a volume bounded by the housing 120 and the moveable member 130.

Vacuum source 110 can be configured to modify a pressure within the volume formed by housing 120 and moveable member 130. When the pressure within the volume formed by housing 120 and moveable member 130 decreases, housing 120 can frictionally engage moveable member 130, such that the movement of the moveable member 130 is impeded.

Figure 2:
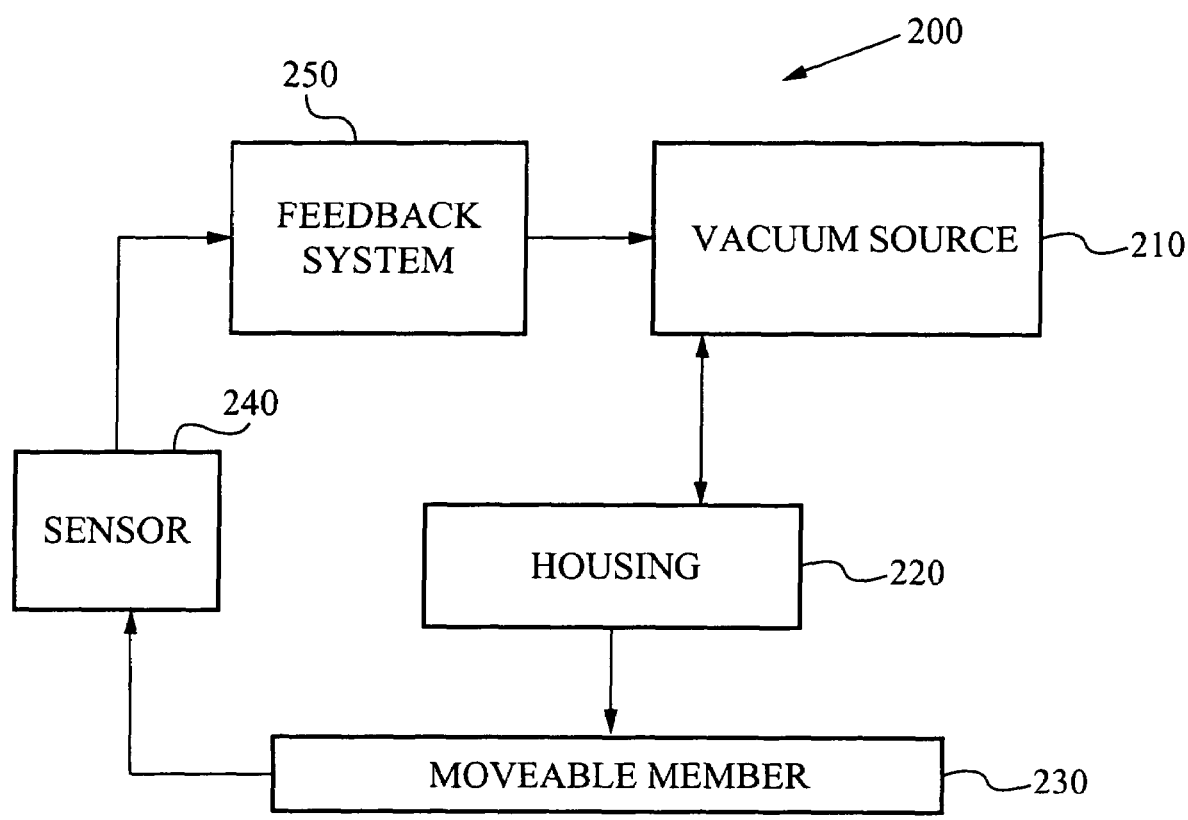
FIG. 2 is a functional block diagram illustrating a haptic feedback system, according to another embodiment of the invention.

FIG. 2 is a functional block diagram illustrating a haptic feedback system, according to another embodiment of the invention. The haptic feedback system as illustrated in FIG. 2 is similar to that illustrated in FIG. 1, except the haptic feedback system in FIG. 2 includes a sensor 240 and a feedback system 250 that is configured to control the haptic feedback output by the haptic feedback system 200.

Haptic feedback system 200 includes a vacuum source 210 that is configured to receive a signal from feedback system 250. Vacuum source 210 is coupled to housing 220. Housing 220 can be located adjacent to moveable member 230, as described above. A sensor 240 can detect a movement of moveable member 230 and send a position signal to feedback system 250 based on the detected movement. Sensor 240 can include, for example, a linear optical encoder, a potentiometer, an optical sensor, or any other type of sensor that can measure the movement of the moveable member 230. Additionally, sensor 240 can measure, for example, a relative or an absolute movement of moveable member 230. Feedback system 250 can include a processor for processing the position signal output by sensor 240 and can be configured to output a haptic feedback signal to the vacuum source 210. When the vacuum source 210 decreases the pressure within the housing 220, housing 220 can frictionally engage moveable member 230 to a greater extent and impede its movement to a greater extent.

Figure 3:
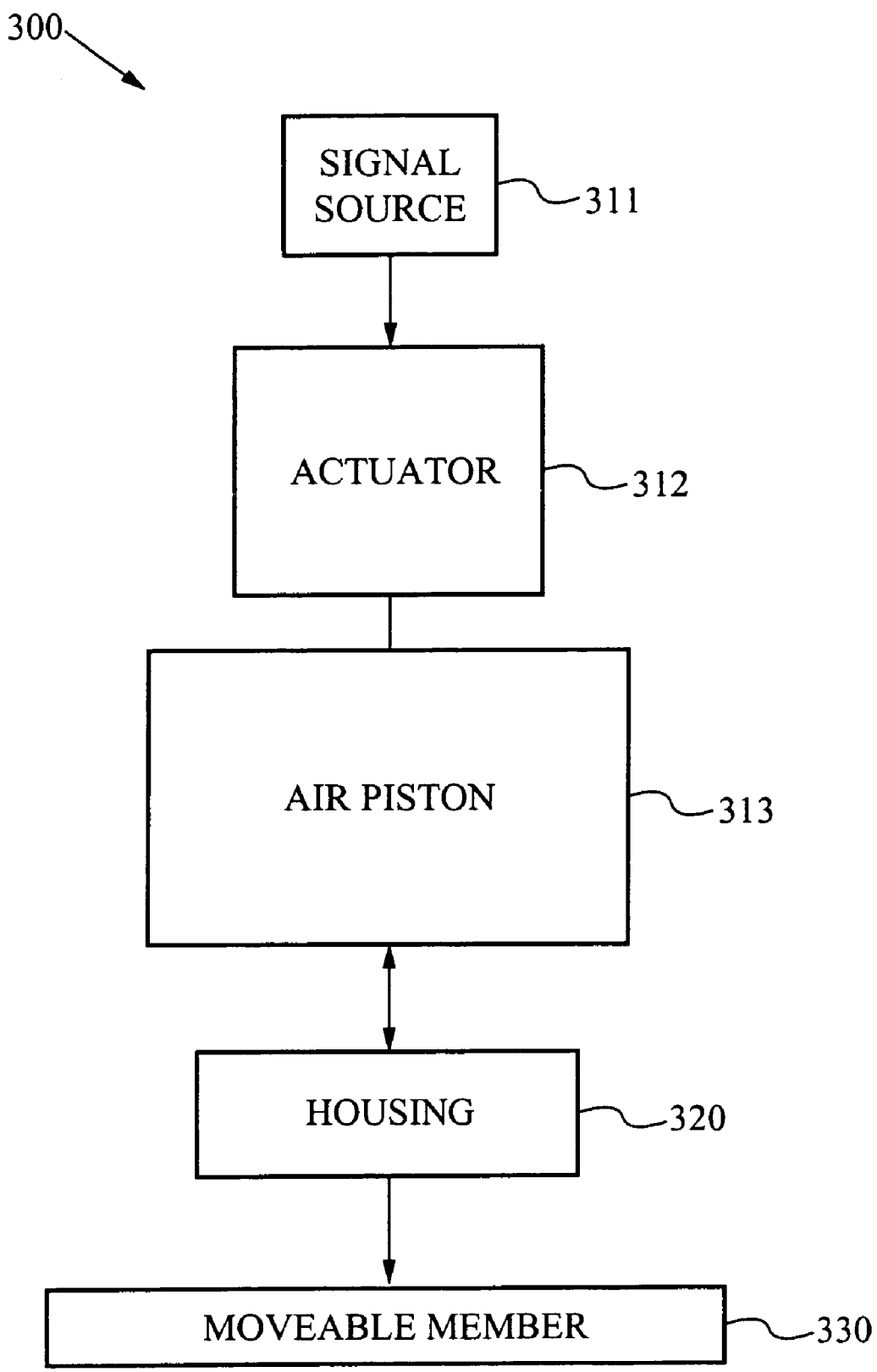
FIG. 3 is a functional block diagram illustrating a haptic feedback system, according to yet another embodiment of the invention.

FIG. 3 is a functional block diagram illustrating a haptic feedback system, according to yet another embodiment of the invention. The haptic feedback system 300 illustrated in FIG. 3 includes a signal source 311. The signal source 311 is coupled to an actuator 312, which in turn, is coupled to an air piston 313. Actuator 312 can be, for example, a voice-coil actuator. Air piston 313 is coupled to housing 320 such that when the actuator 312 actuates the air piston 313, a pressure within housing 320 can be modified. For example, when the pressure within housing 320 is decreased, the motion of moveable member 330 can be impeded at least partially.

In an alternative embodiment, the vacuum source can be used in conjunction with a pressure control device associated with the housing. In such an alternative embodiment, the vacuum source can provide a constant pressure level and the pressure control device can reduce the pressure from its constant level via a valve on the housing.

In yet another alternative embodiment, the vacuum source can be a relatively small, low power pump used in combination with a relatively large storage tank. In this embodiment, the low power pump evacuates the storage tank similar to those, for example, used in automotive lock applications. In other words, the pump can evacuate the storage tank over a long period of time thereby providing high force haptic feedback with minimal instantaneous power drain. In this embodiment, one or more valves can be used to modulate the actuator.

Figure 4:
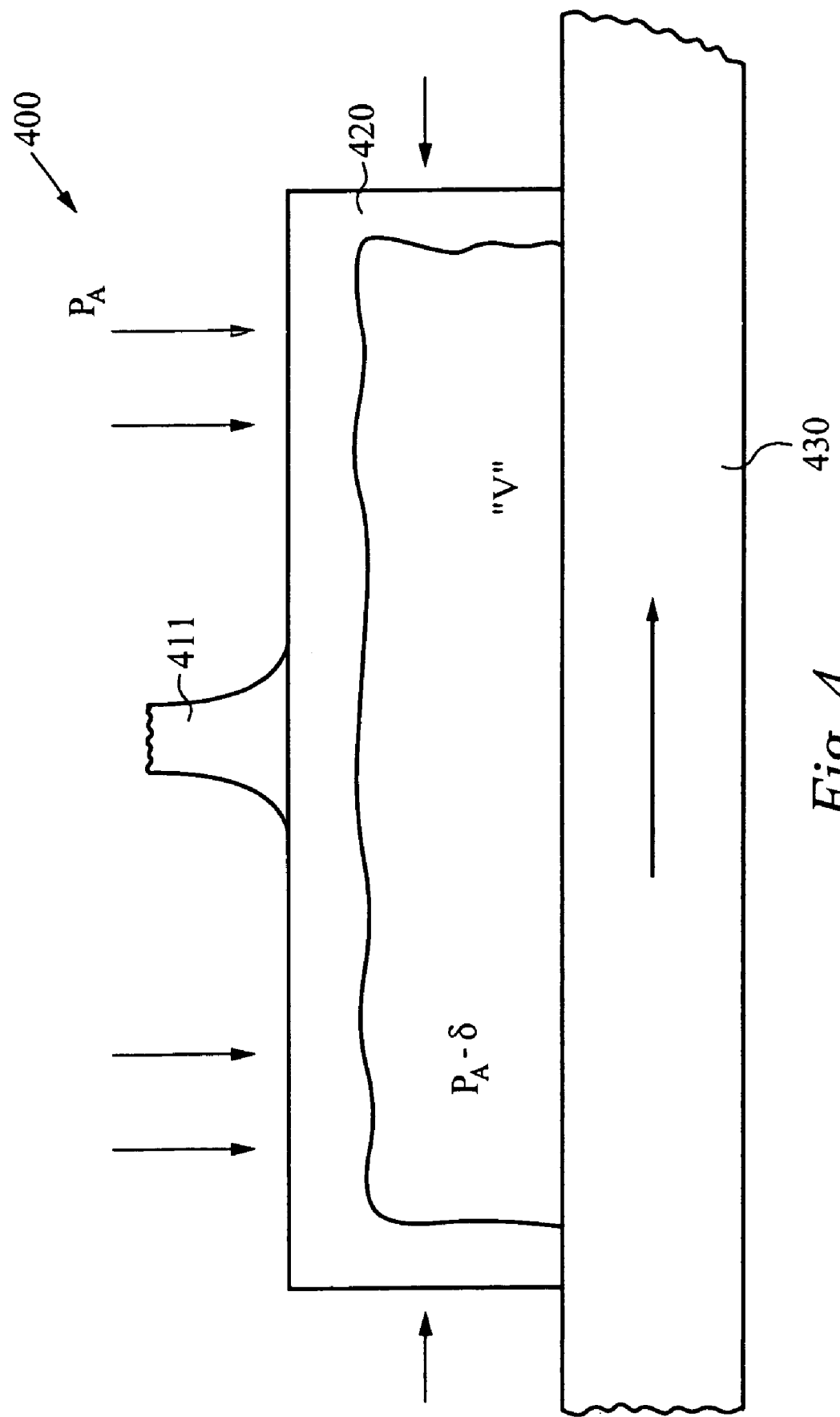
FIG. 4 is a partial cut-away view of a haptic feedback system, according to an embodiment of the invention.

FIG. 4 is a partial cut away view of a haptic feedback system, according to an embodiment of the invention. The haptic feedback system 400 illustrated in FIG. 4 includes a moveable member 430 and a housing 420. Housing 420 includes an interior cavity, such that when housing 420 is located adjacent to moveable member 430, a volume is bounded by the housing 420 and the moveable member 430. Housing 420 can be adjacent to moveable member 430. The housing 420 includes a port 411. Port 411 allows the ingress and egress of gasses to permit a vacuum source to change a pressure within housing 420. In an alternative embodiment, the port allows only the egress of gases and gases are drawn into the volume at the housing/moveable member interface.

In one embodiment, an atmospheric pressure outside of housing 420 can be, for example, $P_A$. Atmospheric pressure $P_A$ is connoted in FIG. 4 by vectors directed towards housing 420. The atmospheric pressure $P_A$ is typically applied to the entire outer side of housing 420. In the embodiment illustrated in FIG. 4, the pressure within the volume is $P_A - \delta$, where $\delta$ is the change in pressure from the atmospheric pressure caused by the vacuum source. In other words, the pressure change is caused by suction being applied to port 411, thereby changing the pressure within the volume by $\delta$.

Figure 5:
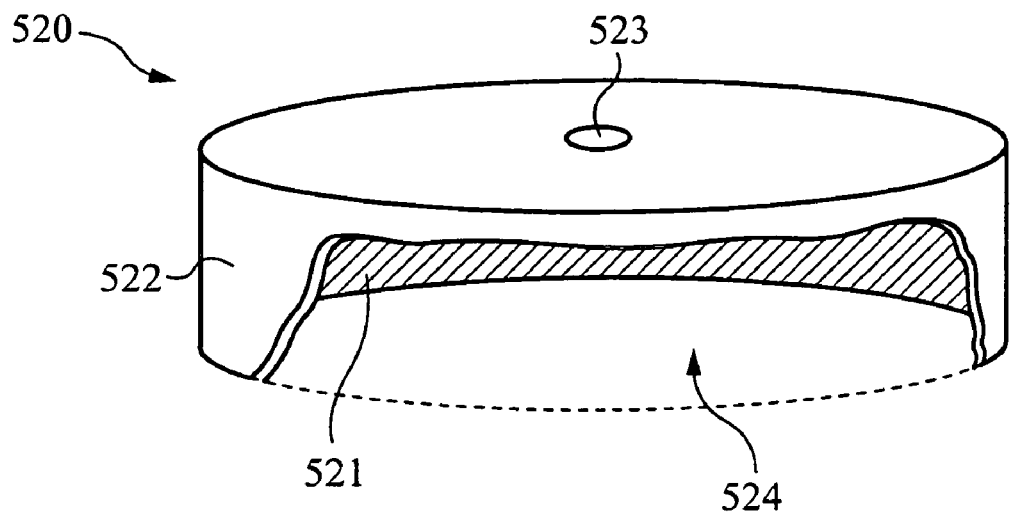
FIG. 5 is a partial cross-sectional view of a housing, according to an embodiment of the invention.

FIG. 5 is a partial cross-sectional view of a housing, according to an embodiment of the invention. Housing 520 can be, for example, cylindrical in shape. Housing 520 includes a port 523. Housing 520 includes an outer surface 522 and an inner surface 521. Housing 520 defines a cavity 524.

Figure 6:
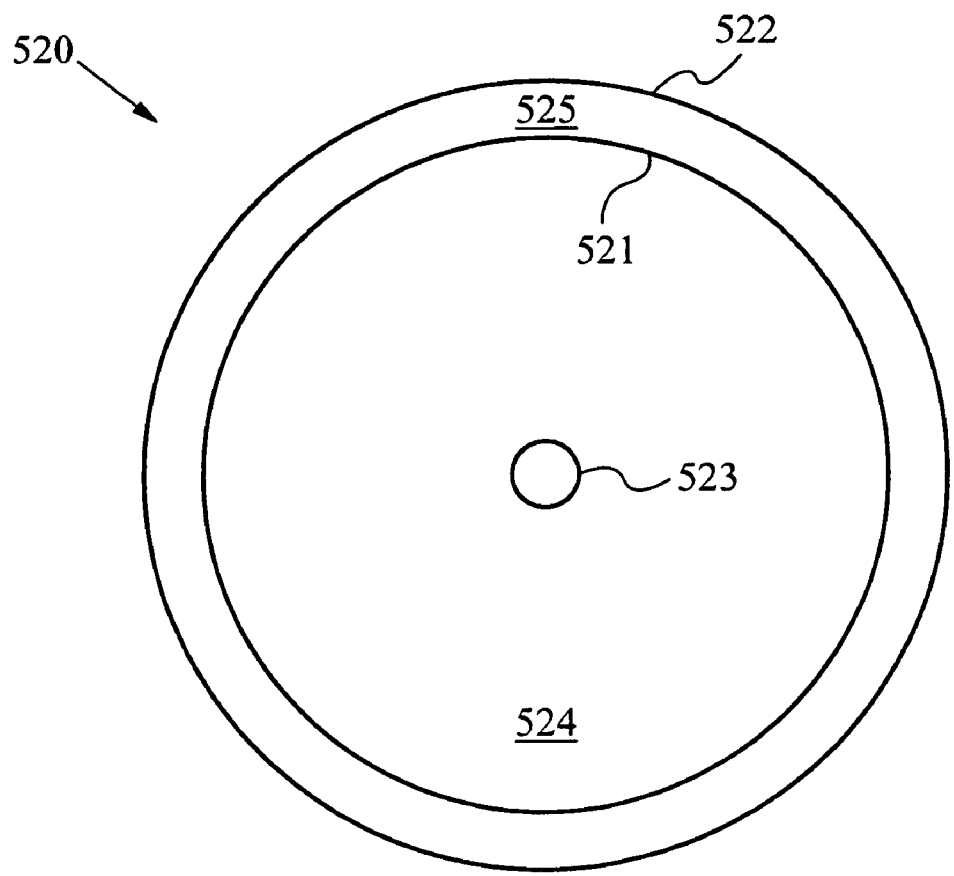
FIG. 6 is a bottom view of a housing, according to an embodiment of the invention.

FIG. 6 is a bottom view of the housing illustrated in FIG. 5. As described above, housing 520 includes an inner surface 521, and an outer surface 522. The inner surface 521 and the outer surface 522 can form a rim 525, which is configured to contact a moveable member (as described above). The inner surface 521 and outer surface 522 are configured to form a cavity 524. When cavity 524 is located adjacent to a movable member such that rim 525 is slidably coupled to the moveable member, the housing 520 and the moveable member define a volume.

Although rim 525 of housing 520 is shown as being a monolithically formed portion of housing 520, the rim can have a different structure. For example, in one embodiment, the rim of the housing can include a resilient material (not shown). Such a resilient material can be, for example, foam coupled to the housing via a double-sided adhesive tape. This resilient material can have a smooth surface or a rough, frictional surface as desired. A resilient rim structure can, for example, reduce of the leakage of vacuum pressure within the housing. Also, in some embodiments, the resilient rim structure can present a contact area greater than that of the housing edge alone. In general, a resilient rim structure can provide different or improved feeling to the haptic feedback for the overall haptic device.

Figure 7:
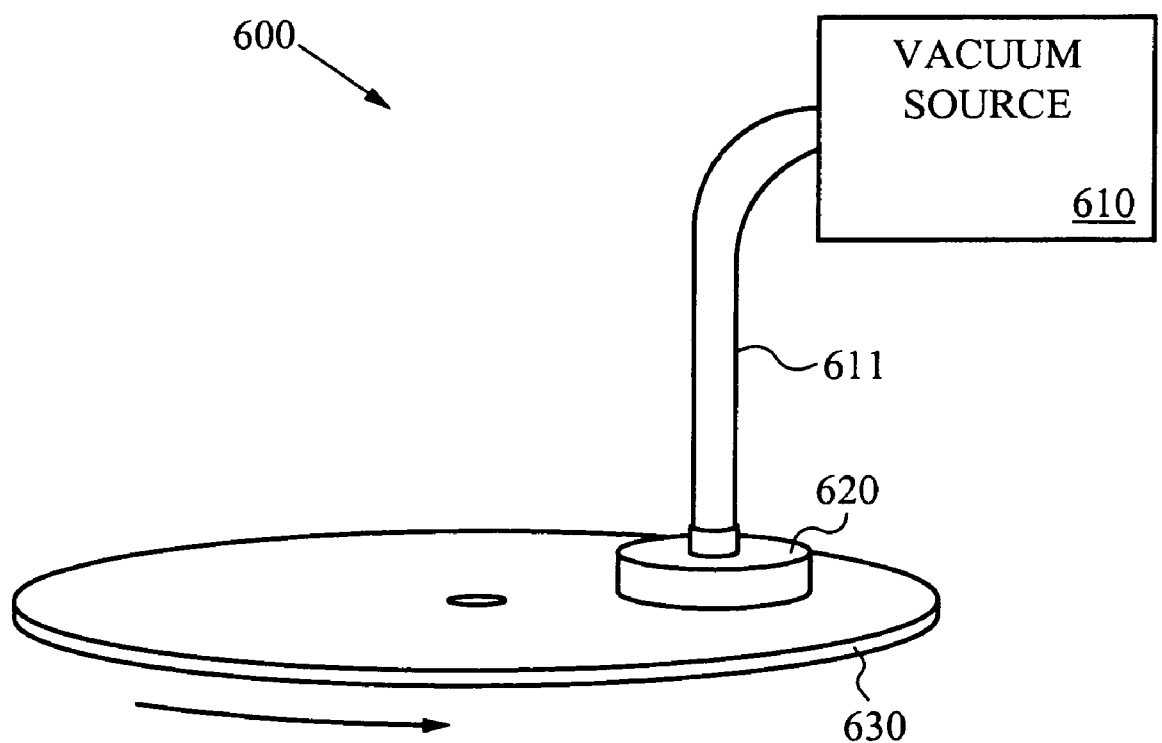
FIG. 7 is an elevation view of a haptic feedback system, according to an embodiment of the invention.

FIG. 7 is an elevation view of a haptic feedback system, according to an embodiment of the invention. A haptic feedback system 600 includes a vacuum source 610. Vacuum source 610 is coupled to a housing 620 via a tubular member 611, which can be, for example, made of flexible plastic tubing. Housing 620 can be located adjacent to a moveable member 630. The tubular member 611 can be, for example, fixedly or removably coupled to vacuum source 610 and housing 620.

The interfaces between the tubular member 611 and vacuum source 610, the tubular member 611 and the housing 620, and the housing 620 and moveable member 630 need not be configured to maintain a perfect vacuum. Leakage around the component interfaces can be compensated by the selective addition or removal or gasses from housing 620. To this end, a pressure sensor (not illustrated) can be coupled to the housing 620 such that a desired pressure is maintained. The pressure sensor can be configured to measure a pressure within the housing 620 and the vacuum source 610 can modify its output based on the measured pressure so that the pressure can be held substantially constant within the housing 620.

Vacuum source 610 can be configured to receive a haptic feedback signal from, for example, a processor (not shown in FIG. 7). In one embodiment, the processor can be located in a computer (not illustrated). In one embodiment, the haptic feedback signal can be modulated at a frequency of, for example, between 20 Hz and 20 kHz, such that the pressure within the housing 620 is modified rapidly. In another embodiment, the haptic feedback signal can be modulated at a frequency up to, for example, 100 Hz. The vacuum source can remove a gas, which can be, for example, air, from the volume defined by housing and moveable member 630. The gas can be, for example, added and/or removed through tubular member 611. In other embodiments, vacuum source 610 can be configured to add selectively gas to the cavity based on the received haptic feedback signal. In one embodiment, tubular member 611 is a flexible tubular member, which can be made out of, for example, plastic. In other embodiment, tubular member can be inflexible and made of rigid materials such as metal or glass.

In the embodiment illustrated in FIG. 7, housing 620 can be held against moveable member 630 by, for example, a gravitational force. In other embodiments, housing 620 can be biased against moveable member 630 using, for example, a leaf spring. Other biasing elements can be used to maintain the position of the housing 620 adjacent to the moveable member 630 such as, for example, helical springs, rigid members, or any other suitable biasing elements. When the pressure is lowered within the cavity, housing 620 will frictionally engage the moveable member 630 to a greater extent and can impede, at least partially, the rotational movement of moveable member 630. In addition to being adjacent to moveable member 630, housing 620 can be configured, for example, to remain in a substantially fixed position within the plane of motion of moveable member 630. An optional support structure (not shown) can be configured to keep housing 620 at a particular position within a plane parallel to the surface of the moveable member 630.

In one alternative embodiment, a moveable-member housing (not shown in FIG. 7) can be included. Such a moveable-member housing, disposed about the moveable member 630, can include an opening through which housing 620 can be disposed. More specifically, the moveable-member housing can have a cylindrical shape with an upper portion and a side portion disposed above and around, respectively, moveable member 620. The moveable-member housing can constrain the movement of moveable member 620. In one embodiment, the moveable-member housing can include one or more sensors (e.g., one or more strain gauge sensor) to measure lateral movement of moveable member 620. In such an embodiment with sensor(s), the measured lateral movement of moveable member 620 can be used in a feedback loop to control the torque applied by housing 620.

Figure 8:
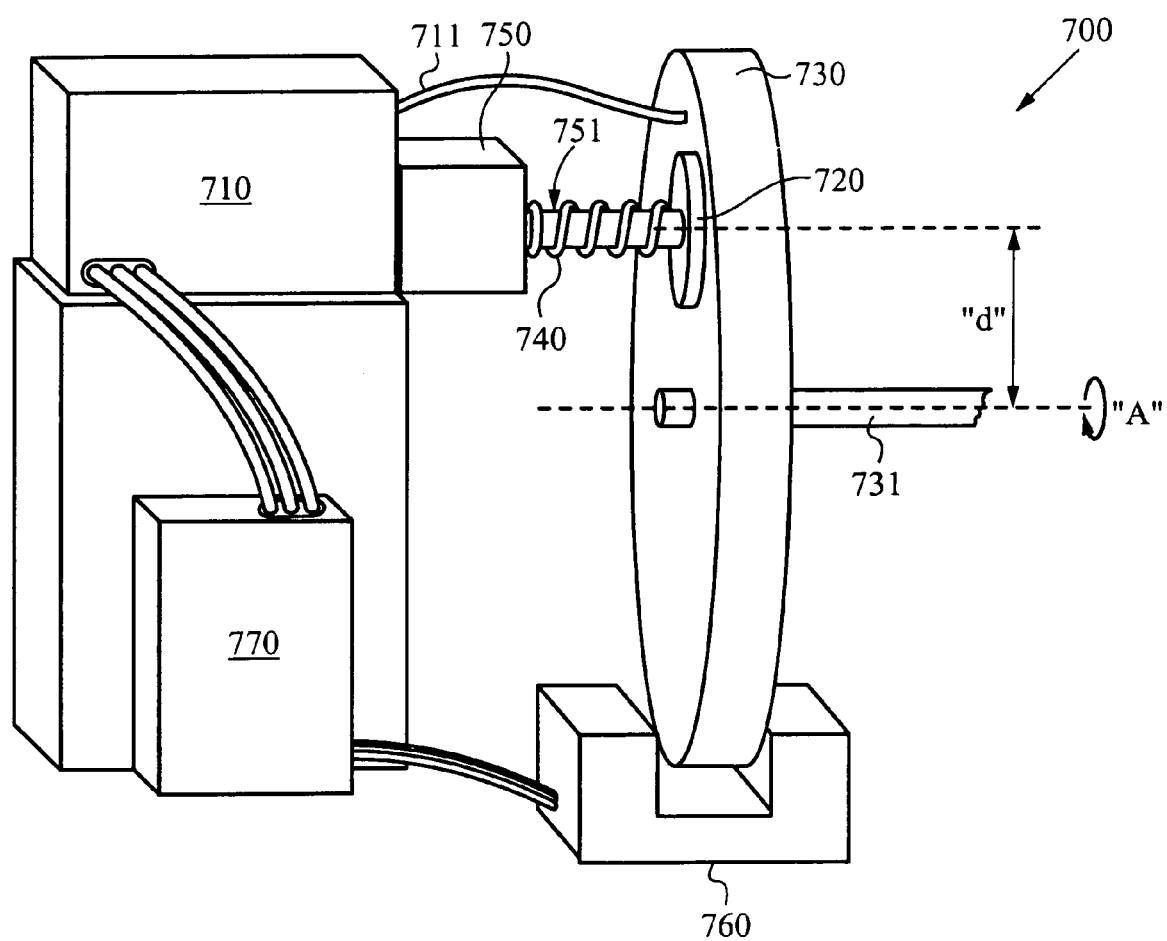
FIG. 8 is a side elevation view of a haptic feedback system, according to another embodiment of the invention.

FIG. 8 is a side elevation view of a haptic feedback system 700, according to another embodiment of the invention. Haptic feedback system 700 includes a vacuum source 710. Vacuum source 710 can be coupled to a processor 770. Vacuum source 710 can be coupled to housing 720 via a tubular member 711. Housing 720 can be biased towards moveable member 730 by biasing member 740. Additionally, the position of the housing 720 within the plane of the moveable member 730 is held substantially constant by support post 751. Support post 751 can be coupled to base member 750. In one embodiment, biasing member 740 can be, for example, a helical spring. Biasing member 740 can be positioned between the base member 750 and the housing 720. The base member 750 can be coupled to the structure of an interface device (not shown); in other words, the base member 750 can be mechanically grounded within an interface device. An interface device can be, for example, any type of device that acts as a man-machine interface. For example, interface device can include a simulated surgical instrument, an actual surgical instrument, a medical procedure simulation system, a computer mouse, a joystick, a track ball, or a multiple degree of freedom device.

Vacuum source 710 can be configured to receive a haptic feedback signal from a processor 770. The haptic feedback signal can be based on a position signal from sensor 760. Sensor 760 can include, for example, a linear optical encoder, a potentiometer, an optical sensor, or any other type of sensor that can measure the movement of the moveable member 730. Additionally, sensor 760 can measure, for example, relative or an absolute movement of moveable member 730. In the embodiment illustrated in FIG. 8, moveable member 730 is a rotating disk that is configured to rotate about an axis, "A." Thus, sensor 760 can output a position signal to the processor 770 based on the rotation of a moveable member 730. Processor 770 can output a haptic feedback signal based on the position signal to the vacuum source 710. Vacuum source 710 can then modify the pressure within housing 720 to thereby increase, or decrease the amount of friction applied by the housing 720 to the moveable member 730.

In the embodiment illustrated in FIG. 8, housing 720 is located a radial distance "d" from the axis "A". The distance "d" can be varied to provide a different resistive torque to the moveable member. For example, as the distance "d" increases, the resistive torque that can be applied to the moveable member 720 can be increased. In other words, the resistive torque that can be produced by the vacuum source 710 and the housing is a function of the radial distance, "d" of the housing 720 from the axis "A".

In one embodiment, a torque force can be exerted on rod 731. Rod 731 can be coupled to moveable member 730. The torque force exerted on the rod 731 can cause the moveable member 730 to rotate. When the moveable member 730 rotates, sensor 760 can detect the rotation of the moveable member and can produce a position signal associated with the detected movement of the moveable member 730. In the illustrated embodiment, the moveable member 730 is a disk. This need not be the case, as the moveable member 730 can be any shape, such as for example, elliptical, rectangular, or any other suitable geometrical shape.

Sensor 760 outputs the position signal to the processor 770. Processor 770 is configured to receive the position signal and to produce a haptic feedback signal based on the received position signal. Processor 770 can output the haptic feedback to a vacuum unit 710, which in turn can increase and/or reduce the pressure within housing 720. When the pressure within housing 720 is decreased, the resistive force applied by the housing 720 to the moveable member 730 increases, thereby impeding, at least partially, the movement of the moveable member 730.

This embodiment can be used in place of, for example, magnetorheological braking mechanisms, brake shoe mechanisms and disc brakes in haptic feedback devices. For example, the force applied to rod 731 can be due to the force applied to, for example, a bicycle pedal. Alternatively, the force applied to the rod 731 can include the force applied to the handle of a simulated fishing reel. In general, embodiments described herein can be used, for example, in any haptic device having a resistive actuator.

Although FIG. 7 shows housing 720 being coupled to a rotating member (i.e., moveable member 730), other couplings are possible. In alternatively embodiments, for example, a vacuum-based housing can be coupled to a linear-moving or translational-moving member. Such a linear-moving member can be, for example, a bearing moving on a track where the vacuum-based housing variably impedes movement of the bearing. Such a translation-moving member can be, for example, mouse-like device moveable in one dimension or two dimensions (e.g., within an x-y plane) where the vacuum-based housing variably impedes movement of a ball at the base of the mouse.

Figure 9:
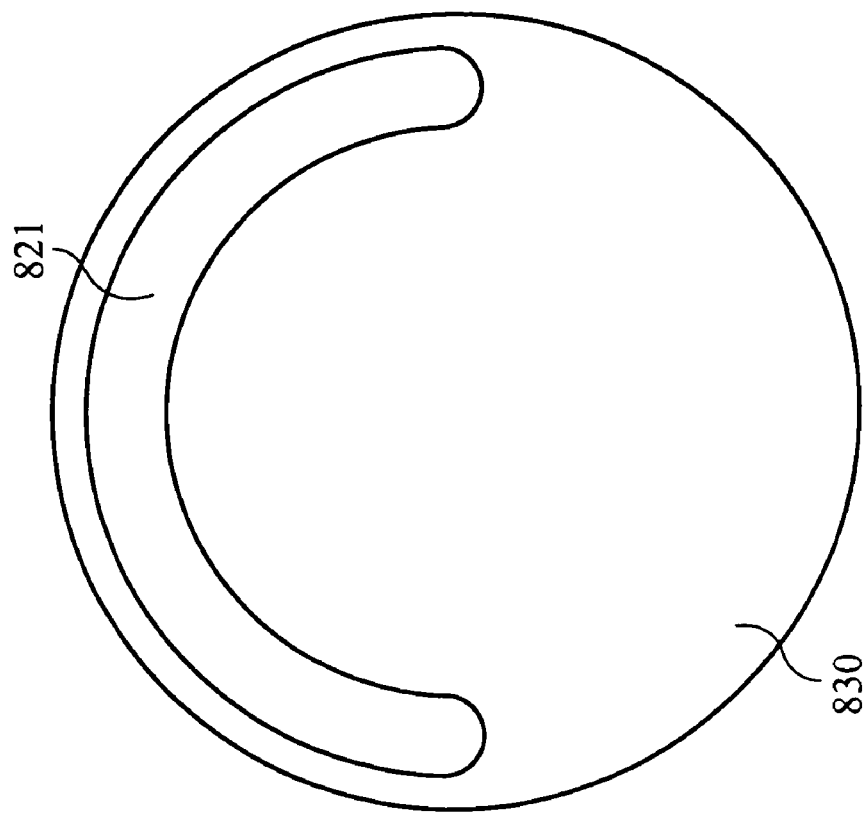
FIG. 9 is a top view of a rotating member including a housing having a first configuration, according to one embodiment of the invention.

FIG. 9 is a top view of a rotating member including a housing having a first configuration. For example, the housing 821 illustrated in FIG. 9 is a crescent-shaped housing 821. As illustrated in FIG. 9, crescent-shaped housing 821 has an arcuate length that is parallel to the rotational direction of motion of the moveable member 830. Crescent-shaped housing 821 can be configured to be held in proximity to moveable member 830. In one embodiment, crescent-shaped housing 821 is configured to be held adjacent to moveable member 830 by a gravitational force. In an alternative embodiment, crescent-shaped housing 821 can be held adjacent to the moveable member 830 by, for example, a biasing member (not shown).

In some embodiments, the crescent-shaped housing 821 can be configured to apply a greater resistive torque than, for example, a housing with a circular cross section, at a given constant vacuum source level. This is due to the fact that the surface area of the disk is concentrated further from (i.e., at a greater radial distance from) from the hub. Consequently, the resistive torque is greater for the crescent-shaped housing 821 than for a circular housing of the same area. In some embodiments, a less powerful vacuum can be used with the crescent-shaped housing 821 to achieve the same resistive forces as a circular housing.

In yet other embodiments, the housing can extend less than or more than 180 degrees shown in FIG. 9. For example, in one alternative embodiment, the housing can extend substantially 360 degrees; in other words, in this alternative embodiment, the housing can extend in a substantially circular shape about the entire moveable member rather than in a crescent shape.

Figure 10:
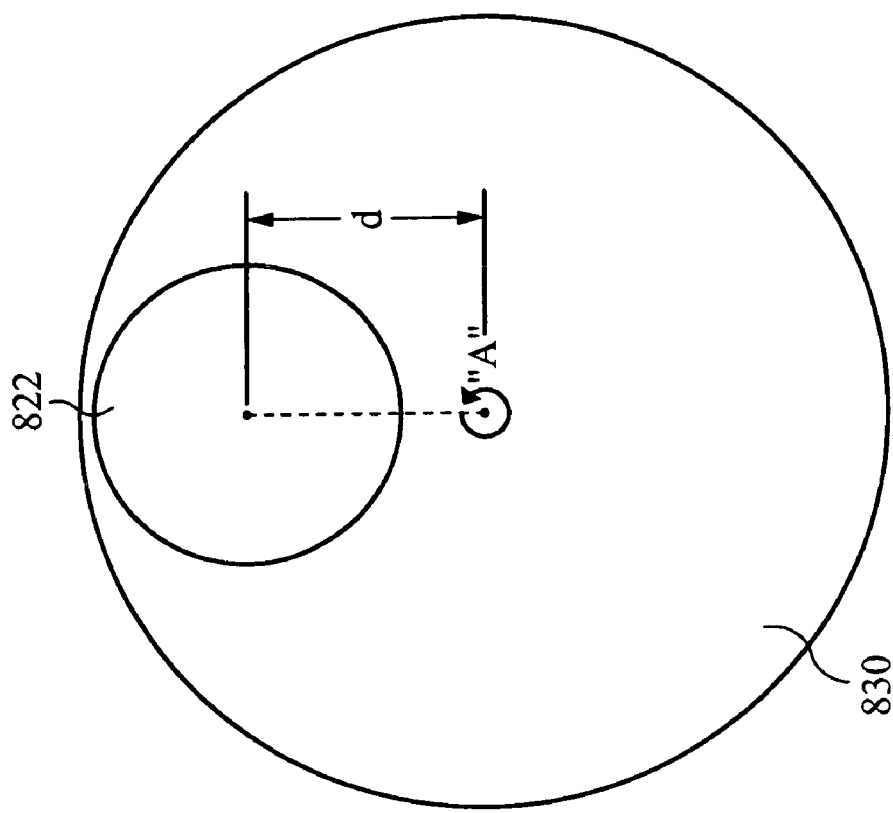
FIG. 10 is a top view of a rotating member including a housing having an alternative configuration, according to another embodiment of the invention.

FIG. 10 is a top view of a rotational member including a circular housing 822. Circular housing 822 can be positioned a radial distance "d" from the axis "A", as described with reference to FIG. 8. As discussed above, the rim of the circular housing is configured to frictionally engage the moveable member 830. Thus, the local pressure applied by the housing 822 to the moveable member 830 would be the air pressure differential $(P_A-\delta)$ times the ratio of the area of the surface area of the rim to the surface area of the moveable member. Using this relationship, a haptic feedback system can be constructed for many different haptic feedback devices that utilize resistive haptic feedback.

Figure 11:
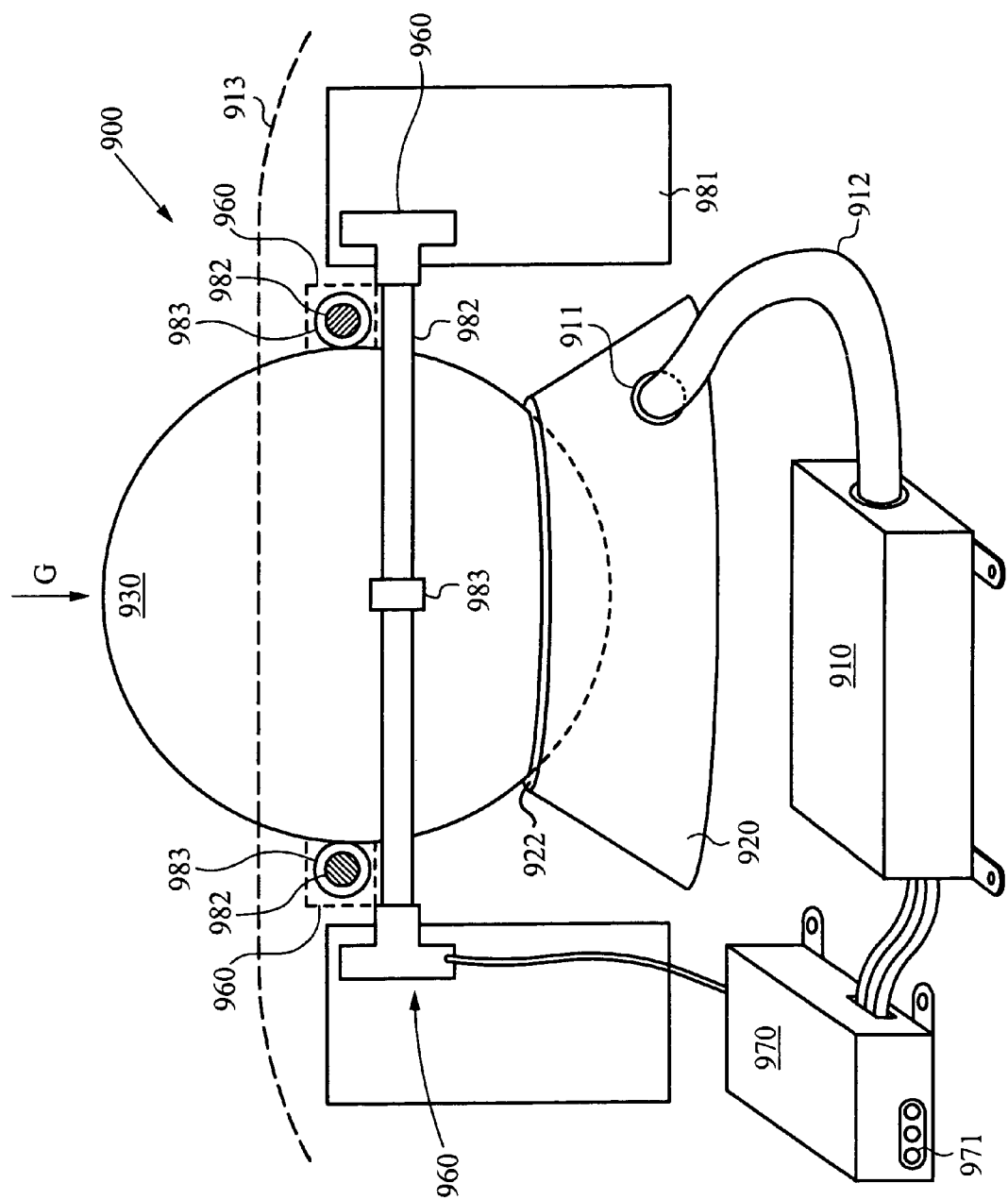
FIG. 11 is an elevation view of a track ball having a haptic feedback system, according to an embodiment of the invention.

FIG. 11 is an elevation view of a track ball having a haptic feedback system, according to an embodiment of the invention. A track ball system 900 configured to provide haptic feedback includes a ball 930 and a housing 920. Track ball 930 can be configured to rest on rim 922 of housing 920. Housing 920 includes a port 911 through which gasses can flow into tubular member 912. A vacuum source (described above) is coupled to port 911 such that a pressure within the housing can be changed via tubular member 912. Vacuum source 910 is coupled to processor 970 and can modify the pressure within housing 920 based on a haptic feedback signal received from processor 970. Processor 970 can also include a port 971 though which processor 971 can interface with, for example, a host computer (not illustrated). Sensors 960 can be coupled to processor 970. Sensors 960 are configured to detect a movement of track ball 930. Sensors 960 can be mounted to support structures 981. Support structures 981 can be configured to support rods 982. Rods 982 can include rollers 983 that are configured to frictionally engage track ball 930.

Track ball 930 and housing 920 can be located within a base structure 913, which is illustrated by a broken line. Base structure 213 can include any form of track ball structure and can include additional components, such as, for example, buttons, knobs, or switches. Any known track ball system configuration can be used.

When track ball 930 is placed on rim 922, a gravitational force "G" can keep the track ball 930 over the housing 920. When a vacuum source 910 reduces the pressure within the volume defined by housing 920 and track ball 930, the frictional force applied to the track ball 930 is increased as the downward force on the track ball 930 is increased, thereby impeding the rotational movement of track ball 930. In an alternative embodiment, the vacuum source can be configured to increase the pressure within housing 920 such that track ball 930 feels lighter than it would if "G" were the only force applied to the ball. In some embodiments, this upward flow of gasses can make the track ball 930 feel as though it were floating.

Processor 970 can be configured to receive a position signal from the sensors 960. When track ball 930 rotates against rollers 983, rollers 983 rotate, which in turn can cause the rod 982 to rotate. This rotation can be detected be sensors 960, which are configured to output the position signal based on the movement of the track ball 930. In the embodiment illustrated in FIG. 11, for example, the processor 970 can be configured to receive a different position signal associated with a movement in each degree of freedom of the track ball 930. Processor 970 is configured to output a haptic feedback signal to the vacuum source 910. The vacuum source 910 can raise or lower the pressure within the volume defined by the housing 920 and the track ball 930 such that track ball 930 is, for example, either more easily moved or more difficult to move.

It is to be understood that the embodiment of the track ball system 900 illustrated in FIG. 11 only illustrates some of the components for the application of haptic feedback in a track ball system. Track ball devices generally have a number of other working features, such as sensors to send position information to a processor. This position information can be sent to, for example, a computer, which can in turn update the position of, for example, a cursor in a graphical user interface (GUI). These sensors are not depicted in FIG. 11 to facilitate an easier understanding of the application of haptic feedback in a track ball device, and not to suggest that track ball system 900 does not utilize such elements.

Figure 12:
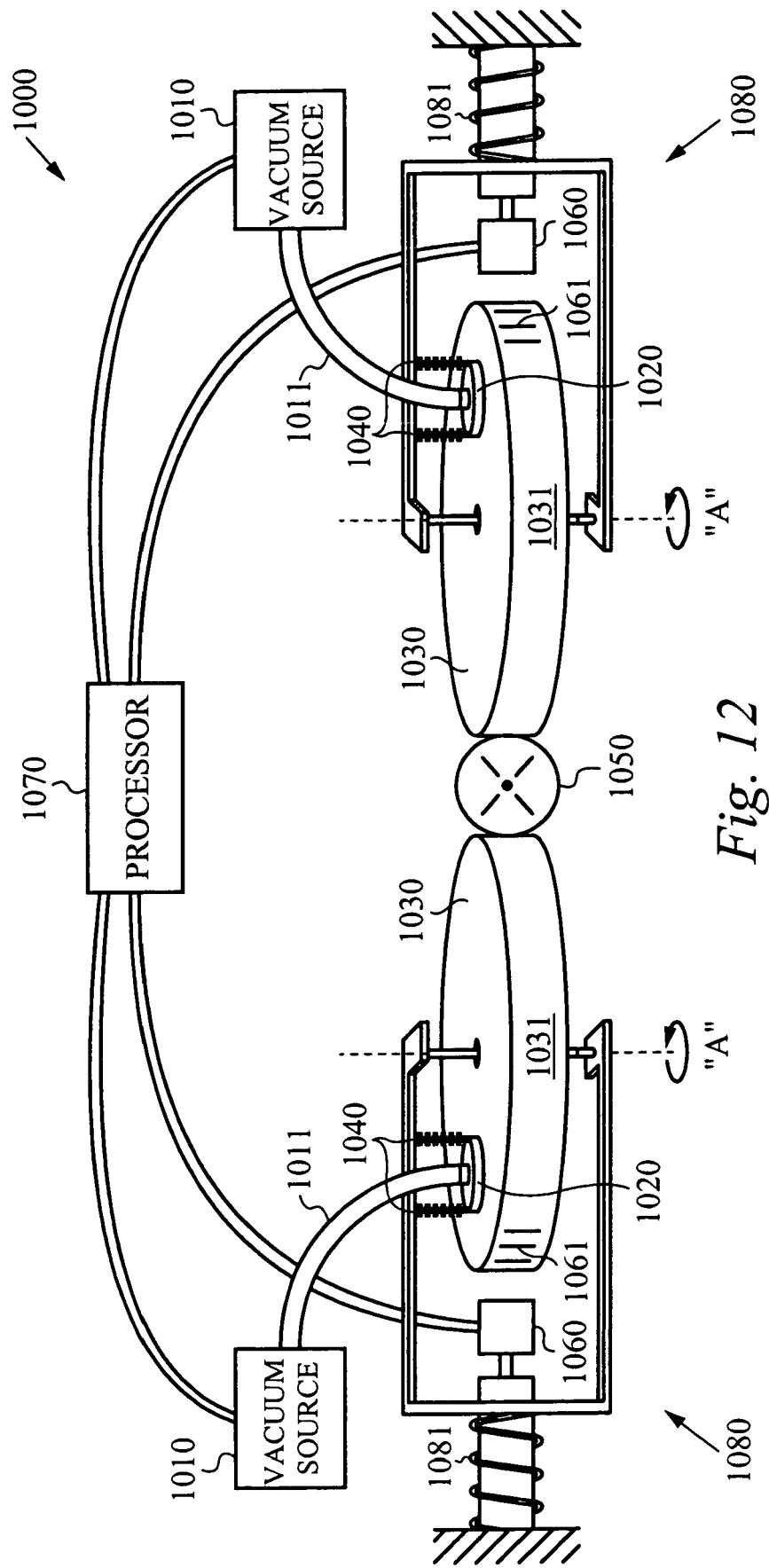
FIG. 12 is a side elevation view of a haptic feedback system, according to yet another embodiment of the invention.

FIG. 12 is a side view of a haptic feedback system, according to yet another embodiment of the invention. The haptic feedback system illustrated in FIG. 12 can be used in, for example, a surgical simulation system such as the system disclosed in U.S. patent application Ser. No. 09/237,969, entitled "Interface Device and Method for Interfacing Instruments to Medical Procedure Simulation Systems," filed on Jan. 27, 1999, now U.S. Pat. No. 6,929,481, which is hereby incorporated by reference in its entirety.

In the embodiment illustrated in FIG. 12, haptic feedback can be applied in a similar method as described above with reference to FIGS. 1–8. As illustrated in FIG. 12, a haptic feedback system can include a pair of moveable members 1030. Housings 1020 each can be positioned adjacent to a respective moveable member 1030. Vacuum sources 1010 can be coupled to housings 1020 via tubular members 1011. Vacuum sources 1010 can receive haptic feedback signals from processor 1070, and can be configured to increase and/or reduce the pressure within the respective volume within housings 1020. Moveable members 1030 each can be supported by a respective support member 1080, such that moveable members 1030 can rotate about an axis "A". Springs 1081 can be configured to bias the support members 1080 towards the elongated member 1050, such that the moveable members 1030 are brought into contact with the elongated member 1050.

Housings 1020 can be biased by springs 1040 such that each housing is in contact with the moveable member 1030. Support structure 1080 can include support members 1082 that are configured to keep housings 1020 in relatively the same position with in the plane of rotation of the moveable member 1030.

Sensors 1060 can be located proximate to the moveable members 1030 such that the movement of the moveable members 1030 is detected. Sensors 1060 can output a position signal to processor 1070. Processor 1070 can produce a haptic feedback signal and output the haptic feedback signal to the vacuum sources 1010. Sensors 1060 each can be, for example, an optical sensor and can detect the presence of indicators on the respective moveable member 1030. Numerous other types of sensors can be used to detect a motion of the moveable members 1030.

Moveable members 1030 can be spaced apart from one another so as to permit the passage of an elongated member 1050. Elongated member 1050 can be, for example, a surgical instrument or a simulated surgical instrument. In one embodiment, the surgical instrument can be a working channel instrument of an endoscope. Elongated member 1050 can be moved between moveable members 1030. The distance between moveable members 1030 can be approximately the width of the working channel instrument. Housings 1020 can be located adjacent to moveable members 1030. In one embodiment, moveable members 1030 can be disk-shaped. Additionally, in one embodiment, moveable members 1030 can include a coating or a layer of material 1031 with a relatively high coefficient of friction disposed on the surfaces configured to contact the moveable member 1050. This coating layer of material 1031 can improve the interaction between elongated member 1050 and moveable members 1030.

In one embodiment, an elongated member 1050, for example, a surgical instrument, can be inserted into the simulation system 1000. The elongated member 1050 can cause a distance between the two moveable members 1030 to increase until the distance is substantially the same diameter as the elongated member 1050. The elongated member 1050 is configured to be inserted in a direction orthogonal to an axis "A". The insertion of elongated member 1050 between the two moveable members 1030 can cause the moveable members to rotate about the axis "A". The rotation of the moveable members about the axis "A" can cause sensors 1060 to detect a movement of the moveable members 1030 and output a position signal to processor 1070. Processor 1070 can be configured to perform, for example, a medical procedure simulation program. Using the position information received from the sensor 1060, processor 1070 can output a haptic feedback signal to vacuum sources 1010. Vacuum sources 1010 can modify the pressure within the housings 1020 based on the received haptic feedback signal.

For example, if the received haptic feedback signal is configured to cause a decrease in pressure within each of the housings 1020, the user manipulating the elongated member 1050 can feel resistance to the continued movement of the elongated member 1050 because the housings 1020 are impeding the rotation of the moveable members 1030. Surfaces with a relatively high coefficient of friction 1031 can be used to prevent the elongated member 1050 from slipping between moveable members 1030. For example, when used in connection with a surgical procedure simulation system 1000, decreasing the pressure within housings 1020 can cause a user to feel that the elongated member 1050, for example, a surgical instrument, has reached a simulated blockage or other bodily impediment to motion. In one embodiment, the pressure within the housings 1020 can be low enough as to substantially prohibit further motion of the moveable members 1030. This embodiment can simulate a complete blockage or other bodily impairment to motion. Alternatively, the pressure within the volume of the housing can be modified such that the movement of the moveable members 1030 is only impeded slightly. This embodiment can allow the user to perceive a restriction to the further motion of the elongated member 1050.

In addition to being used in a medical procedure simulation system, the haptic feedback system 1000 illustrated in FIG. 12 can be used to provide haptic feedback in an endoscope. Endoscopes having haptic feedback are described generally in U.S. patent application Ser. No. 09/811,358 entitled "Method and Apparatus for Controlling Force For Manipulation of Medical Instruments" filed on Mar. 16, 2001, now U.S. Pat. No. 6,817,973, which is hereby incorporated by reference in its entirety. In this embodiment of the invention, elongated member 1050 can include a working channel instrument, which can be for example, a catheter. Haptic feedback system 1000 can impede, at least partially, the movement of the elongated member 1050 before it exits the end of a working channel. This embodiment can facilitate easier changing of the working channel tools.

Figure 13:
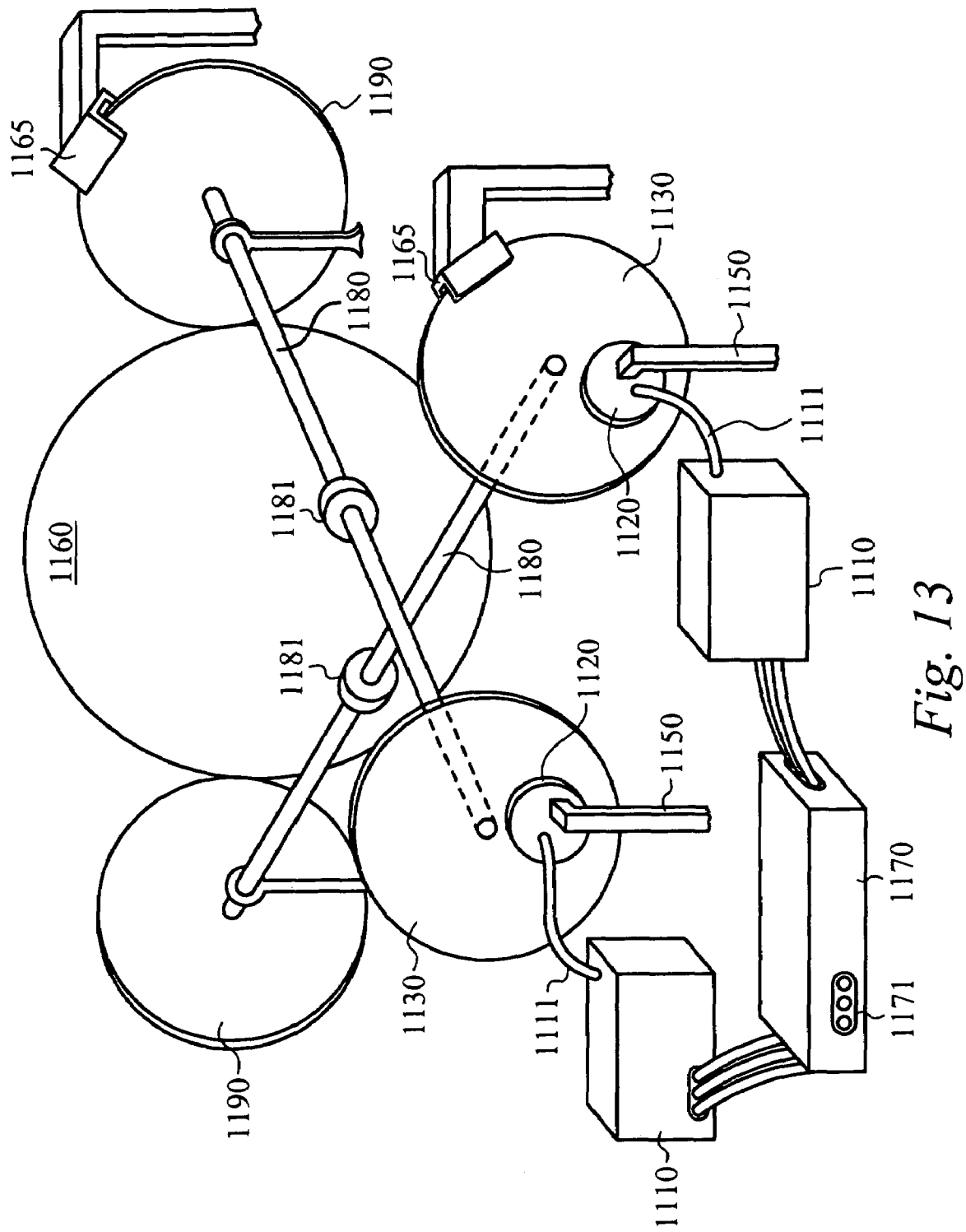
FIG. 13 is a elevation view a haptic feedback system for a computer mouse, according to an embodiment of the invention.

FIG. 13 is an elevation view a haptic feedback system for a computer mouse, according to an embodiment of the invention. The haptic feedback system illustrated in FIG. 13 includes a ball 1160, which can be configured to roll across a surface. Ball 1160 can be configured to engage rods 1180, which are configured to frictionally engage ball 1160 via rollers 1181. Rods 1180 are coupled to moveable members 1130 and 1190. Housings 1120 can be configured to engage the moveable members 1130 when the pressure within the housings 1120 is decreased by vacuum sources 1110. To keep the position of housings 1120 substantially fixed in the plane of the moveable member 1130, housings 1120 can be coupled to support members 1150. Support members 1150 can be coupled to a mechanical ground (not shown) such as a mouse housing, for further stabilization. Vacuum sources 1110 can be configured to receive a haptic feedback signal from a processor 1170. Processor 1170 includes a port 1171. Port 1171 can be configured to interface with, for example, a host computer or another processor (not shown).

As ball 1160 is rolled across a surface, rods 1180 are rotated, which in turn causes moveable members 1130 and 1190 to rotate. Sensors 1165 can be configured to detect a movement of ball 1160 based on the rotation of one moveable member 1130 and one moveable member 1190. Sensors 1165 can output a position signal based on the movement of the ball 1160 to, for example, processor 1170. Processor can be configured to output a haptic feedback signal to vacuum sources 1110, which in turn can adjust the pressure within the volumes of housings 1120 such that the rotation of ball 1160 is impeded. In one embodiment, only one housing 1120 and vacuum source 1110 is used to produce resistive haptic feedback in each degree of freedom of the mouse (i.e., one vacuum source 1110 and housing 1120 in each of the x- and y-axes). In another embodiment, a vacuum source and a housing can be used in connection with each moveable member 1130 and 1190.

Figure 14:
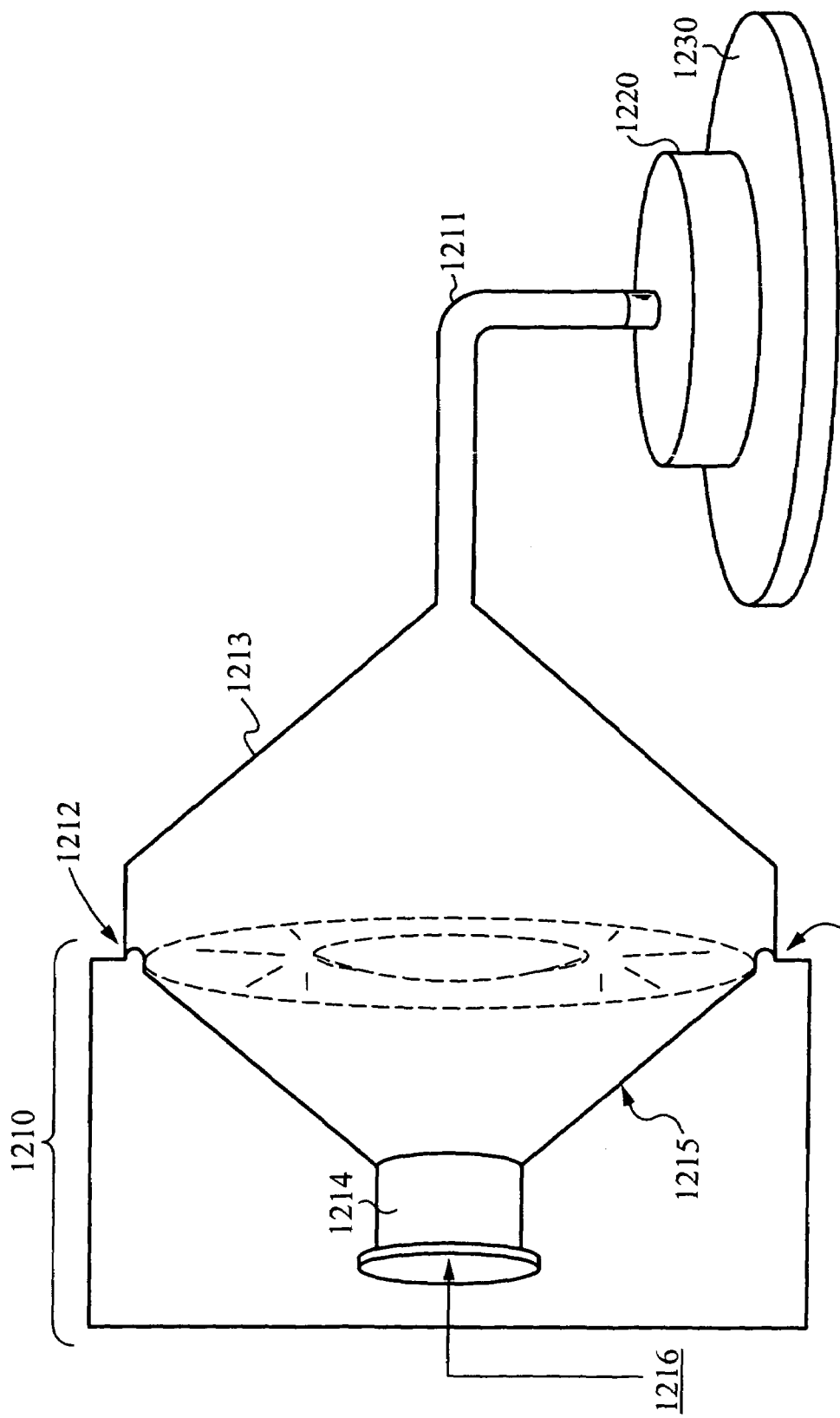
FIG. 14 is a perspective view of a haptic feedback system, according to yet another embodiment of the invention.

FIG. 14 is a perspective view of a haptic feedback system, according to yet another embodiment of the invention. In the embodiment illustrated in FIG. 14, the vacuum source described above can be replaced with a speaker 1210 having an actuator 1214, a cone 1215, and a funnel 1213. Funnel 1213 can be any type of appropriately rigid material such as metal. Actuator 1214 can be for example, a voice-coil actuator and can be configured to receive a haptic feedback signal 1216 from a source (not shown). This haptic feedback signal can be modulated, for example, between 20 Hz and 20 kHz, if desired. In another embodiment, the haptic feedback signal can be modulated at a frequency up to, for example, 100 Hz. Funnel 1213, can be coupled to a housing 1220 via tubular member 1211. Housing 1220 can be located proximate to the moveable member 1230, such that a volume can be formed between the cavity of the housing 1220 and the moveable member 1230.

When a haptic feedback signal 1216 is received at the actuator 1214, the cone 1215 of speaker 1210 will vibrate, causing fluctuations of the pressure within the volume 1213. This fluctuation of pressure within the funnel 1213 will likewise cause the pressure within the tubular member 1211 and the volume of the housing 1220 to decrease and/or increase. A decrease in the pressure within the volume of housing 1220 can cause the housing to engage frictionally the moveable member 1230 such that the movement of the moveable member 1230 is impeded, at least in part.

In one embodiment, the haptic feedback signal 1216 can be modulated, for example, between 20 Hz and 20 kHz. In another embodiment, the haptic feedback signal 1216 can be modulated at a frequency up to, for example, 100 Hz. This modulation in the haptic feedback signal can cause the actuator 1214 to modulate the speaker 1210 at the frequency of the received haptic feedback signal. Thus, the pressure within the housing 1220 can be modulated at approximately the modulation frequency of the haptic feedback signal 1216. When the actuator 1214 is actuated by the haptic feedback signal 1216, the pressure will dissipate on the positive strokes of the actuator 1214 because the increase in pressure within housing 1220 will cause leakage around the housing/moveable member interface; and the negative strokes will cause a resistive haptic pulse to be applied to the moveable member 1230. Thus, the haptic feedback system will pass positive strokes and can output haptic feedback based on the negative strokes of the actuator 1214.

In an alternative embodiment, the positive strokes can be utilized to provide haptic feedback as well. In this embodiment, an additional housing (not illustrated) can be coupled to the rear of the speaker, in the same manner as housing 1220. In this embodiment, the positive strokes from the actuator 1214 would produce a resistive force with the first housing (e.g., 1220) and for the negative strokes would produce a resistive force with the second housing (not illustrated).

In yet another embodiment, the embodiment illustrated in, for example, FIG. 7 can be combined with the embodiment illustrated in FIG. 14. Thus, a system can include both pulsed haptic feedback from the speaker system 1210, and can include a fixed resistive haptic feedback from the vacuum source (e.g., 710). This embodiment can permit both low frequency and high frequency haptic effects in a haptic feedback device.

In another alternative embodiment, an actuator 1214 can include a frictional pad on one side of the actuator. The actuator 1214 can be configured to cause the frictional pad to engage the moveable member 1230 based on a periodic signal. This embodiment can have less magnetic hysteresis than a haptic device having a magnetorheological haptic feedback systems. In other words, because a vacuum-based system does not involve the activation and deactivation of a magnetic coil, magnetic hysteresis is of little to no concern unlike some haptic device embodiments having a magnetorheological brake where magnetic hysteresis can be a concern. Thus, a vacuum-based system can facilitate the production of more precise high frequency haptic effects.

Figure 15:
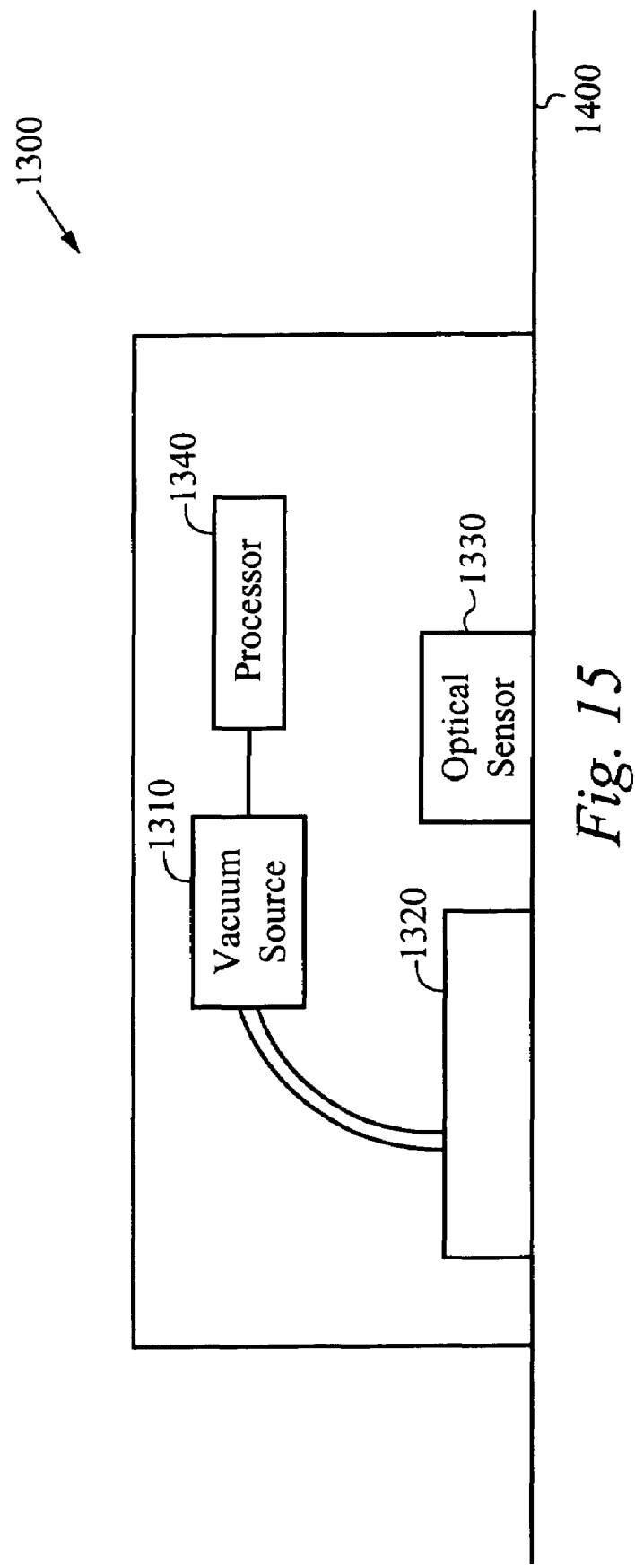
FIG. 15 is a functional block diagram of a computer mouse having a haptic feedback system, according to yet another embodiment of the invention.

FIG. 15 is a functional block diagram of a computer mouse having a haptic feedback system, according to yet another embodiment of the invention. As shown in FIG. 15, computer mouse 1300 includes a vacuum source 1310, housing 1320, an optical sensor 1330 and processor 1340. Computer mouse 1300 is moveable across surface 1400, which can be for example a mouse pad or desk surface. Housing 1320 is configured to engage surface 1400 when the pressure within the housing 1320 is decreased by vacuum source 1310. Vacuum source 1310 is configured to receive a haptic feedback signal from processor 1340. Processor 1340 can include a port (not shown) to interface with, for example, a host computer or another processor (not shown).

As computer mouse 1300 is moved across surface 1400, optical sensor 1330 can provide a position signal based on the movement of the computer mouse 1300. The position signal can be provided to, for example, the host computer or other processor (not shown). Based on this position signal, the haptic feedback signal can be provided from processor 1340 to vacuum source 1310, which in turn can adjust the pressure within the volume of housing 1320 such that the movement of computer mouse 1300 is impeded.

Although the computer mouse is shown in FIG. 15 as having only a single vacuum source and housing, multiple such vacuum sources and housing within a given computer mouse are possible. In such an embodiment, one or more of the vacuum sources and housings can be actuated in a way to produce translational and/or rotational effects. In other words, by activating different vacuum sources within an array or matrix of vacuum sources over a period of time, translational haptic feedback effects (e.g., having a varying haptic feedback effect across an x-y plane) and/or rotational feedback haptic effects can be produced.

In an alternative embodiment, the surface upon which the computer mouse moves can include multiple vacuum-based haptic systems rather than the computer mouse. In such an embodiment, the vacuum-source housing within the surface is configured to engage the underside of the computer mouse when the pressure within the housing is decreased by vacuum source. Thus, the pressure within the housing can be decreased to impede the movement of the computer mouse.

While various embodiments of the invention have been described above, it should be understood that they have been presented by way of example only, and not limitation. Thus, the breadth and scope of the invention should not be limited by any of the above-described embodiments including a track ball, surgical simulation system, or a computer mouse, but should be defined only in accordance with the following claims and their equivalence.

While the invention has been particularly shown and described with reference to embodiments thereof, it will be understood that various changes in form and details can be made therein without departing from the spirit and scope of the invention. For example, the track ball embodiment described can be modified into the form of a mouse device. More specifically, housing 920 can be placed adjacent to a moveable member located at the ends of each of the rods 982, similar to the computer mouse embodiment illustrated in FIG. 13.

Additionally, a simulation system, as depicted in FIG. 12 need not include two moveable members 1030, but rather may include a single moveable member 1030 and a fixed surface located adjacent to, but spaced apart from the moveable member such that an elongated member 1050 can be located between the fixed surface and the surface of the moveable member 1031.

Moreover, while particular moveable members were illustrated as disk-like it should be understood that a moveable member can have any shape, including, but not limited to elliptical, rectangular, and triangular. Additionally, while embodiments have been illustrated using a cylindrically-shaped housing, various other shapes of housings are possible, and may be used in connection with any of the aforementioned embodiments. Finally, although some embodiments of the invention have been discussed in reference to particular applications such a trackball, mouse, etc., some embodiments of the invention can be used in other applications such as a rotary knob.

What is claimed is:

1. An apparatus, comprising:
a vacuum source configured to produce a pressure level in response to an input signal;
a movable member; and
a housing defining a cavity and coupled to the vacuum source, the housing being configured to output a haptic feedback by engaging the moveable member, the haptic feedback being associated with the pressure level, the pressure level being associated with a volume defined by the cavity and the moveable member.

2. The apparatus of claim 1, wherein the vacuum source includes:
an actuator;
an air piston; and
a tube having a first end portion and a second end portion, the first end portion being coupled to the air piston and the second end portion being coupled to the housing.

3. The apparatus of claim 1, wherein the housing is substantially cylindrical.

4. The apparatus of claim 1, wherein the housing has an arcuate length parallel to a rotational direction of motion of the moveable member.

5. The apparatus of claim 1, wherein the pressure level is greater than an atmospheric pressure in an environment surrounding the moveable member and the housing.

6. The apparatus of claim 1, wherein the input signal is modulated between and including approximately 20 Hz and 20 kHz.

7. The apparatus of claim 1, further comprising:
a biasing element, the biasing element being configured to bias the housing against the moveable member.

8. The apparatus of claim 1, further comprising:
a processor, the processor being configured to provide the input signal to the vacuum source.

9. A method, comprising:
providing a vacuum source configured to produce a pressure level in response to an input signal;
providing a moveable member; and
providing a housing, the housing defining a cavity and coupled to the vacuum source, the housing being configured to output a haptic feedback by engaging the moveable member, the haptic feedback being associated with the pressure level, the pressure level being associated with a volume defined by the cavity and the moveable member.

10. The method of claim 9, wherein providing the vacuum source includes:
providing an actuator;
providing an air piston; and
providing a tube, the tube having a first end portion and a second end portion, the first end portion being coupled to the air piston and the second end portion being coupled to the housing.

11. The method of claim 9, wherein providing the housing includes providing a substantially cylindrical housing.

12. The method of claim 9, wherein providing the housing includes providing a housing having an arcuate length parallel to a rotational direction of motion of the moveable member.

13. The method of claim 9, wherein providing the vacuum source includes providing a vacuum source configured to output a pressure level that is greater than an atmospheric pressure in an environment surrounding the moveable member and the housing.

14. The method of claim 9, further comprising:
providing a biasing member, the biasing member being configured to bias the housing against the moveable member.

15. The method of claim 9, further comprising:
providing a processor, the processor being configured to provide the input signal to the vacuum source.

16. A method, comprising:
receiving a signal; and
modifying, based on the received signal, a pressure within a volume defined by a cavity between a braking member and a moveable member, wherein a resistive force is applied to the moveable member to provide a haptic effect.

17. The method of claim 16, further comprising:
frictionally engaging a surface of the moveable member with the braking member, the resistive force being a function of the pressure within the volume.

18. The method of claim 16, wherein receiving the signal includes:
receiving the signal at a vacuum source, the vacuum source being configured to modify the pressure within the volume in response to the signal.

19. The method of claim 16, wherein receiving the signal includes:
receiving the signal at an actuator, the actuator being coupled to an air piston, the air piston and the actuator collectively configured to modify the pressure within the volume in response to the signal.

20. The method of claim 16, wherein modifying the pressure within the volume includes modifying the pressure to generate a pressure differential between an environment outside of the volume and the pressure within the volume.

21. The method of claim 16, wherein the signal is modulated between and including approximately 20 Hz and 20 kHz.

22. The method of claim 16, wherein the receiving the signal includes receiving the signal from a processor.

23. A computer-readable medium storing code representing instructions to cause a processor configured to be operatively coupled to an apparatus to perform a method, the method comprising:
receiving a signal; and
modifying a pressure within a volume defined by a cavity between a braking member and a moveable member based on the received signal, wherein a resistive force is output to the moveable member by the braking member based on the modifying of the pressure.

24. The computer-readable medium of claim 23, wherein the modifying of the pressure further comprises generating a pressure differential between an environment outside of the volume and the pressure within the volume.

25. The computer-readable medium of claim 23, wherein the method further comprises:
providing a drive signal to a vacuum source, the drive signal being modulated between and including approximately 20 Hz and 20 kHz.

* * * * *

UNITED STATES PATENT AND TRADEMARK OFFICE
CERTIFICATE OF CORRECTION

PATENT NO.         : 7,205,981 B2                                       Page 1 of 1
APPLICATION NO.  : 10/803097
DATED              : April 17, 2007
INVENTOR(S)      : Richard L. Cunningham It is certified that error appears in the above-identified patent and that said Letters Patent is hereby corrected as shown below:

In the Specification, on Column 7, Line 55, the reference numeral "213" should be changed to --913--.

Signed and Sealed this

Fourth Day of September, 2007

JON W. DUDAS
*Director of the United States Patent and Trademark Office*